United States Patent
Des Pommare

(10) Patent No.: US 10,268,264 B2
(45) Date of Patent: Apr. 23, 2019

(54) PHYSIOLOGICALLY ADAPTIVE USER INTERFACE

(71) Applicant: SAP SE, Walldorf (DE)

(72) Inventor: Jean-Nicolas Des Pommare, Walldorf (DE)

(73) Assignee: SAP SE, Walldorf (DE)

( * ) Notice: Subject to any disclaimer, the term of this patent is extended or adjusted under 35 U.S.C. 154(b) by 344 days.

(21) Appl. No.: 15/150,448

(22) Filed: May 10, 2016

(65) Prior Publication Data

US 2017/0329396 A1  Nov. 16, 2017

(51) Int. Cl.
*G06F 3/00* (2006.01)
*G06F 3/01* (2006.01)
(Continued)

(52) U.S. Cl.
CPC .............. *G06F 3/013* (2013.01); *G06F 3/005* (2013.01); *G06F 3/0482* (2013.01); *G06F 3/04817* (2013.01); *G06F 3/04845* (2013.01); *G06F 3/1454* (2013.01); *G06F 17/2872* (2013.01); *G06F 2203/04803* (2013.01)

(58) Field of Classification Search
CPC ..................... G06F 3/013; G06F 3/048; G06F 11/3438–11/3495; H04N 21/44213–21/44222; H04L 67/22
See application file for complete search history.

(56) References Cited

U.S. PATENT DOCUMENTS 5,496,177 A * 3/1996 Collia .................... G06F 9/453
434/118
5,886,683 A  3/1999 Tognazzini et al.
(Continued)

OTHER PUBLICATIONS

Search Report for corresponding European Application No. 16169039.1 dated Nov. 9, 2016.
(Continued)

*Primary Examiner* — Jennifer N To
*Assistant Examiner* — Liang Y Li
(74) *Attorney, Agent, or Firm* — Harness, Dickey & Pierce, P.L.C.

(57) ABSTRACT

A method for controlling an electronic system comprising a microprocessor, an eye tracker component, a display, and a memory. The memory comprises an executable code being executable by the microprocessor. The executable code when executed by the microprocessor causes the electronic system to perform the following: dis-playing a menu on a portion of a screen of the display, wherein at least one symbol being representation of information of the menu is displayed on the portion of the screen, the symbol being a single word, a combination of words, or an icon, each of the at least one symbol having its respective ranking, wherein when the ranking of the symbol is higher than an icon display threshold value it is displayed as its respective icon; registering using the eye tracker component saccades of user eyes of a user each having its starting and/or end gaze fixation point within the portion of the screen; and decreasing the icon display threshold value such that a number of the icons used for the displaying of the menu on the portion of the screen is increased when a number of the registered saccades exceeds a saccade number threshold value.

15 Claims, 9 Drawing Sheets

US 10,268,264 B2
Page 2

(51) Int. Cl.
*G06F 3/14* (2006.01)
*G06F 17/28* (2006.01)
*G06F 3/0481* (2013.01)
*G06F 3/0482* (2013.01)
*G06F 3/0484* (2013.01)

(56) References Cited

U.S. PATENT DOCUMENTS

| | | | | |
|---|---|---|---|---|
| 6,102,870 | A * | 8/2000 | Edwards | A61B 5/16 600/558 |
| 6,577,329 | B1 | 6/2003 | Flickner et al. | |
| 6,873,314 | B1 | 3/2005 | Campbell | |
| 7,881,493 | B1 | 2/2011 | Edwards et al. | |
| 8,918,482 | B2 * | 12/2014 | Ott | G06F 9/4451 709/219 |
| 2006/0050865 | A1 * | 3/2006 | Kortum | G06F 9/453 379/265.07 |
| 2007/0291232 | A1 * | 12/2007 | Marshall | A61B 5/16 351/246 |
| 2009/0086165 | A1 * | 4/2009 | Beymer | A61B 3/113 351/210 |
| 2014/0347265 | A1 * | 11/2014 | Aimone | G09G 3/003 345/156 |
| 2015/0121306 | A1 * | 4/2015 | Fundament | G06F 3/0482 715/811 |
| 2015/0242109 | A1 * | 8/2015 | Mussig | G06F 3/0481 715/763 |
| 2015/0261387 | A1 * | 9/2015 | Petersen | G06F 3/013 715/765 |
| 2017/0336865 | A1 * | 11/2017 | Meyer | G06F 17/30247 |

OTHER PUBLICATIONS

Communication Pursuant to Aricle 94(3) EPC dated Aug. 17, 2018 in association with European Application No. 16 169 039.1.

* cited by examiner

| | 10 | 11 | 12 | 13 | 14 | 15 | 16 |
|---|---|---|---|---|---|---|---|
| | WHEN | TODAY | IS | MONDAY | PERFORM INSTALLATION OF SOFTWARE PATCHES | ON THE COMPUTER SYSTEM | |
| | WHEN | TODAY | IS | TUESDAY | PERFORM DEFRAGMENTATION | OF THE FIRST HARD DISK DRIVE | |
| | WHEN | TODAY | IS | THURSDAY | PERFORM DEFRAGMENTATION | OF THE SECOND HARD DISK DRIVE | |
| | WHEN | TODAY | IS | WEDNESDAY | GENERATE BACKUP | OF THE FIRST HARD DISC DRIVE | |
| | WHEN | TODAY | IS | THURSDAY | GENERATE BACKUP | OF THE SECOND HARD DISK DRIVE | |
| | WHEN | TODAY | IS | FRIDAY | PERFORM GARBAGE CLEAN UP | ON THE FIRST HARD DISK DRIVE | |
| | WHEN | TODAY | IS | SATRUDAY | PERFORM GARBAGE CLEAN UP | ON THE SECOND HARD DISK DRIVE | |
| | WHEN | TODAY | IS | SUNDAY | SWITCH IN THE STANDBY MODE | THE THIRD CENTRAL PROCESSING UNIT | AND |
| | | | | | | THE SECOND CENTRAL PROCESSING UNIT | |

20A

19 — COMPUTER SYSTEM MAINTENANCE SCHEDULE    17 TODAY IS THURSDAY    18 COMPUTER SYSTEM IS ALPHA108

Fig. 1

WORD - ICON CORRESPONDENCE TABLES

RANKING = 2

| | IF; IF THEN |
|---|---|
| WHEN | |
| MAINTENANCE | ⚙️ |
| SCHEDULE | 📋 |
| TODAY | 🗓️ |
| IS | = |
| MONDAY | MON |
| TUESDAY | TUE |
| WEDNESDAY | WED |
| THURSDAY | THU |
| FRIDAY | FRI |
| SATURDAY | SAT |
| SUNDAY | SUN |
| ALPHA108 | α-108 |

RANKING = 1

| | |
|---|---|
| COMPUTER SYSTEM | 💻 |
| PERFORM INSTALLATION OF SOFTWARE PATCHES | 💿 |
| PERFORM DEFRAGMENTATION | 🗂️ |
| GENERATE BACKUP | 💾 |
| PERFORM GARBAGE CLEAN UP | 🗑️ |
| SWITCH IN THE STANDBY MODE | ⏻ |
| ON (IN CONTEXT OF HARD DISK DRIVE); ON (IN CONTEXT OF COMPUTER SYSTEM) | ←; ↑ |
| OF (IN CONTEXT BACKUP); OF (IN CONTEXT DEFRAGMENTATION) | ←; ↔ |
| SECOND HARD DISK DRIVE; | 💽2; |
| FIRST HARD DISK DRIVE | 💽1; |
| THIRD CENTRAL PROCESSING UNIT | ⬜3; |
| SECOND CENTRAL PROCESSING UNIT | ⬜2; |
| AND | & |

Fig. 4

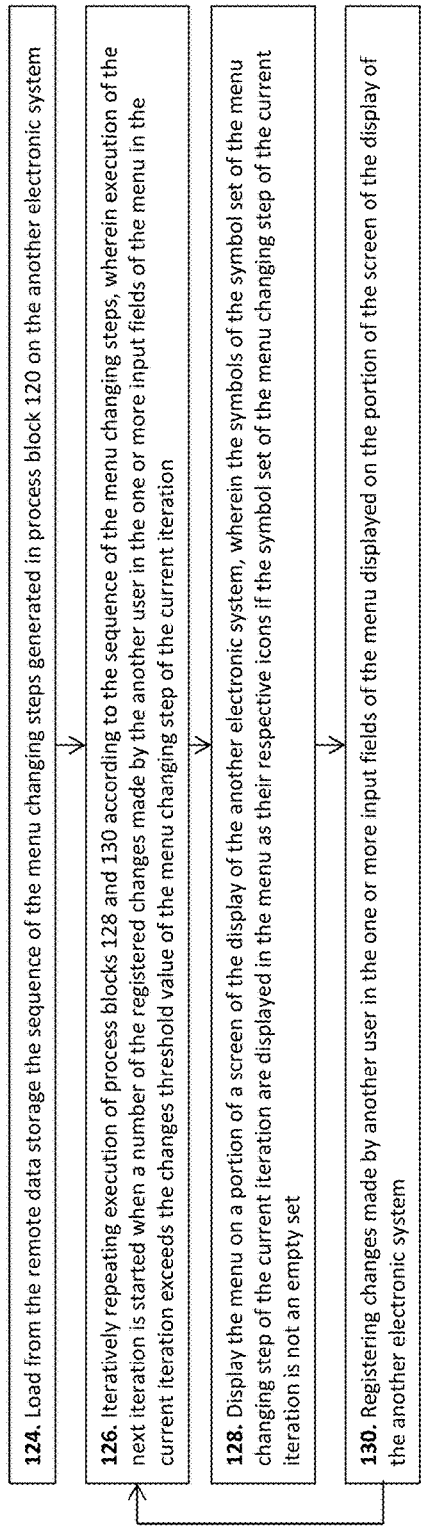

| User nr. | Number of inputs in iteration 1 using view 20A | Number of inputs in iteration 2 using view 20B | Number of inputs in iteration 3 using view 20C |
|---|---|---|---|
| 1 | 5 | 5 | 3 |
| 2 | 8 | 3 | 3 |
| 3 | 6 | 5 | |
| 4 | 5 | 3 | |
| 5 | 4 | 5 | |
| 6 | 3 | 6 | |

Fig. 11

|  | iteration 1 using view 20A | iteration 2 using view 20B | iteration 3 using view 20C |
|---|---|---|---|
| Average number of inputs per user | 5.17 | 4.5 | 1 |
| Menu changing step | 1 | 2 | 3 |
| Symbol set | empty | left table on Fig. 4 | all symbols |

Fig. 12

124. Load from the remote data storage the sequence of the menu changing steps generated in process block 120 on the another electronic system ← 300

126. Iteratively repeating execution of process blocks 128 and 130 according to the sequence of the menu changing steps, wherein execution of the next iteration is started when a number of the registered changes made by the another user in the one or more input fields of the menu in the current iteration exceeds the changes threshold value of the menu changing step of the current iteration ← 301

128. Display the menu on a portion of a screen of the display of the another electronic system, wherein the symbols of the symbol set of the menu changing step of the current iteration are displayed in the menu as their respective icons if the symbol set of the menu changing step of the current iteration is not an empty set ← 302

130. Registering changes made by another user in the one or more input fields of the menu displayed on the portion of the screen of the display of the another electronic system ← 303

Fig. 13

PHYSIOLOGICALLY ADAPTIVE USER INTERFACE

TECHNICAL FIELD

The present disclosure relates to a physiologically adaptive user interface. More particularly, the present disclosure relates to optimization of user interface using feedback information based on user physiology.

BACKGROUND

Human computer interaction is an important topic of computer science since decades. The increased power of graphical display units gives an opportunity to use full strengths of graphical representation of information in comparison with text based user interfaces of the eighties or even nineties of the twentieth century, in addition a lot of knowledge has been collected regarding physiological perception of presented to a human being in a form of a text or symbols. Despite the fact that a lot of theories have been developed in the field of the physiological perception of information a lot of unclear phenomena in this field still remain. For instance, humans tend to ignore/overlook spelling mistakes of particular kind in words, like wrong sequence of letters. Another open question whether an actual field of view when a gaze of human eyes is fixed at a particular word. There is no consensus in the scientific community regarding a number letters in a particular word that can be seen and processed by human brain. Some theories speculate that visibility of a letter in a word decreases with increase of its distance from a center of the visual field (foveal vision) which is fixed as usual at a center of the word. On contrary, some theories speculate that in addition to foveal word processing, a parafoveal and a peripheral information is extracted and used in the process of reading. Human perception of pictures is a separate topic of research. It has been established that sequences of saccades (i.e. gaze fixation points of human eyes) generated by human brain at physiological level are totally different when a human being is looking at a picture (purely graphical representation of information) in comparison with a situation when a human being is reading a text. Despite the fact a picture can carry more information than a text information formulated in a natural language, humans sometimes tend to read comments related to the picture first instead of first studying the picture. Despite very big volume of information related to physiological perception of the information almost no knowledge is available for cases when information is presented as a mixture of words and pictures (e.g. icons)

SUMMARY

Symbol, as understood here, is a graphical representation of information on a screen of an electronic system. The symbol can be a word, a combination of words, an icon, a pictogram, a combination of one or more icons and/or one or more pictograms and/or one or more word.

The present invention provides for a computer-implemented method for an electronic system configured to display information (e.g. a menu or a graphical user interface (GUI)) on its screen in an effective way using physiological data of a user and method for controlling such a system.

According to one embodiment, the present invention relates a method for controlling an electronic system comprising a microprocessor, an eye tracker component, a display; and a memory. The memory comprises an executable code being executable by the microprocessor. The executable code when executed by the microprocessor causes the electronic system to perform the following: displaying a menu on a portion of a screen of the display, wherein at least one symbol being representation of information of the menu is displayed on the portion of the screen, the symbol being a single word, a combination of words, or an icon, each of the at least one symbol having its respective ranking, wherein when the ranking of the symbol is higher than an icon display threshold value it is displayed as its respective icon; registering using the eye tracker component saccades of user eyes of a user each having its starting and/or end gaze fixation point within the portion of the screen; and decreasing the icon display threshold value such that a number of the icons used for the displaying of the menu on the portion of the screen is increased when a number of the registered saccades exceeds a saccade number threshold value.

According to another embodiment, the present invention relates a method for controlling an electronic system comprising a microprocessor, an eye tracker component, a display, and a memory. The memory comprises an executable code being executable by the microprocessor. The executable code when executed by the microprocessor causes the electronic system to perform the following: displaying a menu on a portion of a screen of the display, wherein at least one symbol being representation of information of the menu is displayed on the portion of the screen, the symbol being a single word, a combination of words, or an icon, each of the at least one symbol having its respective ranking, wherein when the ranking of the symbol is higher than an icon display threshold value it is displayed as its respective icon; registering using the eye tracker component saccades of user eyes of a user each having its starting and/or end gaze fixation point within the portion of the screen, decreasing the icon display threshold value such that a number of icons used for displaying the menu on the portion of the screen is increased when a moving average of a number of the registered saccades in the time series has reached its saturation value, wherein the moving average is calculated for a last elapsed time interval of a predefined duration in the time series. The registering using the eye tracker component saccades of the user eyes of the user each having its starting and/or end gaze fixation point within the portion of the screen comprises: starting a timer after registering the first saccade, and halting the timer between the consecutively registered saccades, if any, having only one of their respective starting or end gaze fixation points within the portion of the screen, wherein the registered saccades are registered as a time series of saccades and time in the time series is registered according to the timer.

According to another embodiment, the present invention provides for a computer readable medium having stored thereon a computer executable code for execution by a microprocessor controlling an electronic system, wherein execution of the executable code causes the electronic system to execute a method of any one of the embodiments of the present invention.

According to another embodiment, the present invention provides for an electronic system having a memory storing a computer executable code for execution by a microprocessor controlling the electronic system, wherein execution of the executable code causes the electronic system to execute a method of any one of the embodiments of the present invention.

BRIEF DESCRIPTION OF THE SEVERAL VIEWS OF THE DRAWINGS

In the following embodiments of the invention are explained in greater detail, by way of example only, making reference to the drawings in which:

FIG. 1 is a view of a menu.
FIG. 4 depicts tables of symbol representation.
FIG. 11 is a user data table.
FIG. 12 is a table storing user statistics and data of the menu changing steps.
FIG. 13 is a block diagram of a process.

DETAILED DESCRIPTION

Figure 2:
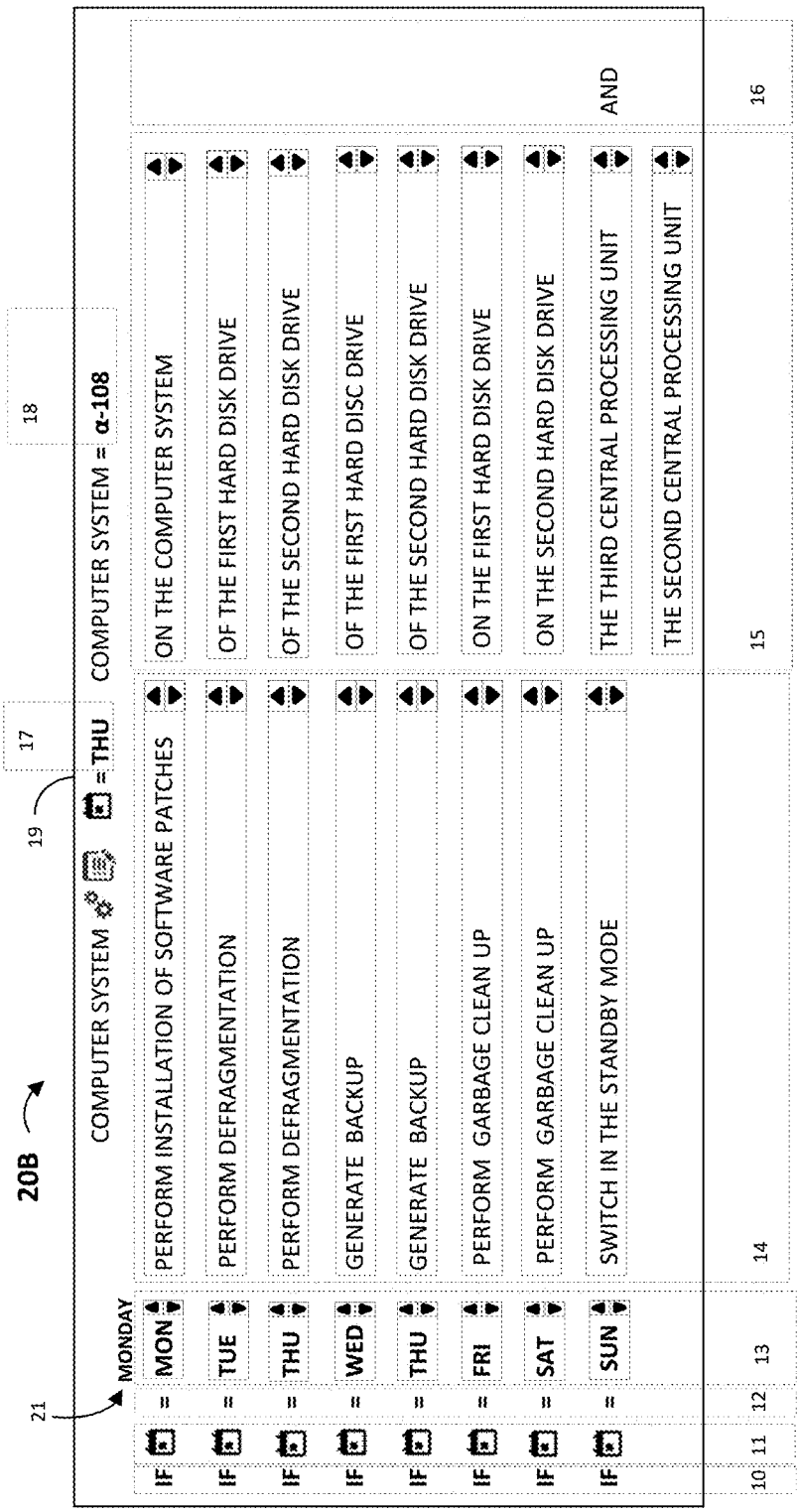
FIG. 2 is a view of a menu.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, electrical, and optical changes may be made without departing from the scope of the present invention. The following description of example embodiments is, therefore, not to be taken in a limited sense, and the scope of the present invention is defined by the appended claims.

There are numerous ways of displaying of information for a user. The information can be displayed for instance in a form of a menu or a GIU. As usual displaying of the information as icons is more compact, but on the other hand it might be too complex for the user, because the meaning of the icons may be not clear to the user. Even in a case of simple home appliances equipment, icons representing different functionalities of this equipment might require calling help functions or finding their meaning in a manual of the equipment. Thus there is a need for optimization of a view of the information in a user friendly way.

The embodiments of the present invention can be advantageous because they use data based on human physiological perception of information as a feedback. Initial displaying of a menu using a lot of icons can be too complex for a user. Thus it might be optimal to substitute some of the words by their respective icons thought usage of the menu by the user. The feedback information is collected without prompting user to perform any additional actions. The next view of the menu using higher number of icons for presenting the menu information is used after a threshold number of saccades are registered. Alternatively, the next view of the menu using higher number of icons for presenting the menu information is used after a moving average of the registered saccades has reached its saturation value.

According to another embodiment, the method further comprises iteratively repeating execution of the steps of: the displaying the menu on the portion of the screen of the display; the registering using the eye tracker component of the saccades of the user eyes of the user each having its starting and/or end gaze fixation point within the portion of the screen; and the decreasing of the icon display threshold value such that a number of the icons used for displaying of the menu on the portion of the screen is increased when a number of the registered saccades in the current iteration exceeds a saccade number threshold value. The iterative repeating of execution of said steps is executed until the menu is fully displayed on the portion of the screen using the icons. A screen area used for displaying on the screen of at least of one of the icons is less than a screen area used for displaying on the screen of its respective word or word combination. A screen area used for the displaying of the menu on the portion of the screen in one of the iterations is bigger than a screen area used for the displaying of the menu on the portion of the screen in another one of the iterations executed after the one of the iterations.

This embodiment can be advantageous because it provides for iterative gradual increase of symbols represented in the displayed menu as their corresponding icons. Since the representation of information as icons might be more compact in comparison of representation of information using words, the area of the portion of the screen used for the displaying of the menu can be gradually decreased throughout the iterative repetitive execution of said steps.

According to another embodiment, the method further comprises iteratively repeating execution of the steps of: the displaying the menu on the portion of the screen of the display; the registering using the eye tracker component of the saccades of the user eyes of the user each having its starting and/or end gaze fixation point within the portion of the screen; and the decreasing of the icon display threshold value such that a number of icons used for displaying the menu in the natural language on the portion of the screen is increased when a moving average of a number of the registered saccades in the time series has reached its saturation value in the current iteration, wherein in the current iteration the moving average is calculated for the last elapsed time interval of the predefined duration in the time series. The iterative repeating of execution of said steps is executed until the menu is fully displayed using the icons or the saturation value reached in the current iteration exceeds the saturation value reached in the previous iteration, wherein a screen area used for displaying on the screen of at least one of the icons is less than a screen area used for displaying on the screen of its respective word or word combination, wherein a screen area used for the displaying of the menu on the portion of the screen in one of the iterations is bigger than a screen area used for the displaying of the menu on the portion of the screen in another one of the iterations executed after the one of the iterations.

This embodiment can be advantageous because it provides for iterative gradual increase of symbols represented in the displayed menu as their corresponding icons. Since the representation of information as icons might be more compact in comparison of representation of information using words, the area of the portion of the screen used for the displaying of the menu can be gradually decreased throughout the iterative repetitive execution of said steps. This process of iterative substitution of the words and/or the word combinations in the displayed menu by their respective icons can be stopped before the menu is fully displayed using only icons. This might be the case when the saturation value of the registered saccades does not decrease from iteration to iteration. This might indicate that a physiological limit of optimum perception of the displayed menu has been reached. The representation of the displayed menu in a particular iteration might use too much icons and as a result thereof a brain of the user generates an increasing number of saccades in order to provide required level of understanding/ interpretation of the displayed menu.

According to another embodiment, the electronic system is a battery powered electronic hand held system and the eye tracking component comprises a video camera configured to register the saccades of the user eyes of the user having its starting and/or end gaze fixation point within the portion of the screen, wherein the electronic system is configured to register user interaction events of the user with the symbols displayed on the menu. The method of any of the aforementioned embodiments further comprises executing another executable code stored in the memory by the microprocessor in response to registering a user interaction event with one or more symbols displayed on the menu.

The user interaction event is understood here in a very broad sense. It might be for instance clicking, scrolling, typing, selecting an option in an input field of the menu, activating an option in the displayed menu in response to finger activation by the user in case when the display has a tough screen functionality, etc. The user interaction event can cause execution of another executable code (e.g. application) when the user interaction event activates this application by selecting its respective icon.

According to another embodiment, the method further comprises causing the electronic system to limit generation of display refresh data for the portion of the screen in response to the iterative repeating of execution of said steps.

This option might be useful for reduction of a power consumption of the electronic system. It could be the case when the user activity is limited to processing of data in the menu. In this case there is no need for the generation of the refresh data for the rest of the display area which does not display the menu.

According to another embodiment, the method further comprises: halting the iterative repeating of execution of said steps in response to terminating of the displaying of the menu on the portion of the screen of the display; and resuming the iterative repeating of execution of said steps in response to restating of the displaying of the menu on the portion of the screen of the display.

This feature can be advantageous, when the user uses the menu in different sessions. The menu can be closed in between the sessions. When the menu is reopened in the next session, the iterative execution of the method can be resumed using the view of the menu used in the previous session.

According to another embodiment, the method further comprises: hating the iterative repeating of execution of said steps in response to terminating of the displaying of the menu on the portion of the screen of the display; and storing the icon display threshold value on a remote data storage in response to the halting of the iterative repetition of the execution of said steps.

This feature can be advantageous, because the data enabling to resume the execution of the iterations is stored on the remote data storage. This enables resuming execution of the method on another electronic system, when the data is downloaded from the remote data storage, which can be a separate memory card or a data storage in a computer cloud.

According to another embodiment, the present invention relates to a method for controlling another electronic system comprising a microprocessor, an eye tracker component, a display, and a memory, the memory comprising an executable code being executable by the microprocessor. The executable code when executed by the microprocessor causes the electronic system to perform the following:

loading from the remote data storage the icon display threshold value which was stored thereon in response to the halting of the iterative repeating of execution of the method steps of previously mentioned embodiment; and resuming the iterative repeating of execution of the method steps of the previously mentioned embodiment on the another electronic system using the loaded icon display threshold value.

This method can provide extra functionality when the execution of the method is continued on the another electronic system configured to display the same menu.

According to another embodiment, the method further comprise: executing the method of the aforementioned embodiments for each user of a user group, wherein the icon display threshold value is decreased from iteration to iteration such that symbol sets of the symbols displayed as the their respective icons in the iterations having the same order in sequences of the iterations for each of the users of the user group are the same, wherein the executing of the method of the aforementioned embodiments for the each user of the user group comprises registering changes made by the each user in one or more input fields of the menu; calculating an average number of the changes in the one or more input fields per user for each of iteration groups of the iterations having the same order in the sequences of the iterations, wherein each of the iteration groups comprises at least a threshold number of the iterations, the threshold number of the iterations being equal or less to a number of the users in the user group and bigger than zero; generating a sequence of menu changing steps, wherein each iteration group for which the average number of the changes per user is calculated has the respective menu changing step, wherein the sequence of the menu changing steps has the same order as the sequence of the iterations comprised in the respective iteration groups, wherein each of the menu changing steps comprises the symbol set being the same as in the iteration of the respective iteration group, wherein each of the menu changing steps comprises a respective changes threshold value being equal to the calculated average number of the changes per user for the respective iteration group; and storing on a remote data storage sequence of the menu changing steps.

This embodiment can be advantageous, for performing the iterative displaying of different views of the menu without using the eye tracker component. The collected statistical data enables switching between different views of the menu using counted inputs performed by a user in the input fields of the menu.

According to another embodiment, the ranking of the symbol is an increasing function of a sum of a number of its repetitions in the menu multiplied by the first weight coefficient and a number of letters in the respective word or the respective word combination multiplied by a second weight coefficient.

This feature can be advantageous for flexible automated calculation of the rankings of the symbols.

According to another embodiment, the present invention provides for a method for controlling another electronic system comprising a microprocessor, a display, and a memory, the memory comprising an executable code being executable by the microprocessor. The executable code when executed by the microprocessor causes the another electronic system to perform the following: loading from the remote data storage of claim 10 the sequence of the menu changing steps of generated in the aforementioned embodiment on the another electronic system; and iteratively repeating execution of the following steps according to the sequence of the menu changing steps, wherein the following steps are: displaying the menu on a portion of a screen of the display of the another electronic system, wherein the symbols of the symbol set of the menu changing step of the current iteration are displayed in the menu as their respective icons if the symbol set of the menu changing step of the current iteration is not an empty set; and registering changes made by another user in the one or more input fields of the menu displayed on the portion of the screen of the display of the another electronic system. The execution of the next iteration is started when a number of the registered changes made by the another user in the one or more input fields of the menu in the current iteration exceeds the changes threshold value of the menu changing step of the current iteration.

This embodiment can be advantageous for executing a method on an electronic system without using the eye tracking component.

According to another embodiment, wherein the symbols displayed in the menu are arranged in accordance with a syntax of a natural language.

This embodiment can be advantageous because it facilitates similar saccade patterns for the different views of the menu.

Figure 3:
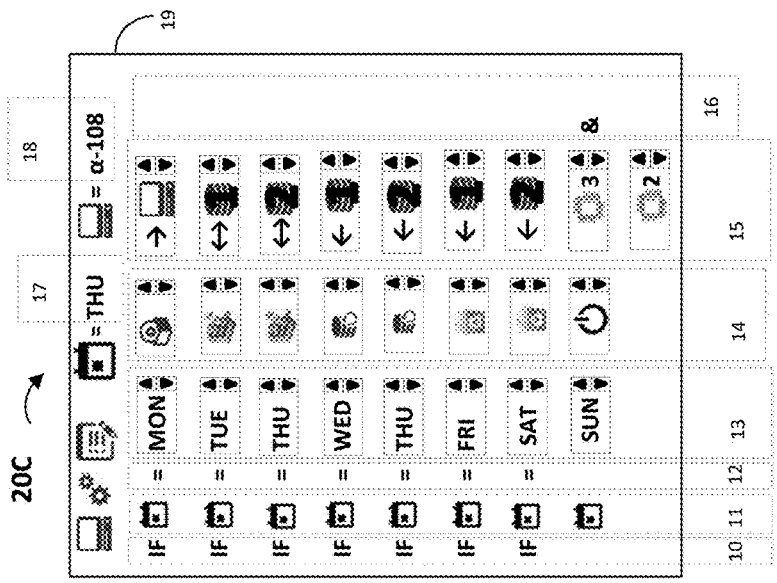
FIG. 3 is a view of a menu.

FIGS. 1-3 illustrates different views 20A, 20B, 20C of an example menu 19 for programming a computer system maintenance schedule, wherein symbols are rep-resented either as their respective words/word combinations or their respective icons as depicted in tables of correspondence on FIG. 4. FIG. 1 illustrates the view of the menu, wherein all symbols are displayed as their respective words or word combinations. The menu comprises fields 10, 11, 12 for displaying fixed information, optional fields 16 for uniting different functionalities where, fields 17, 18 for displaying variable information, and input fields 13, 14, 15 for imputing different options in the menu. This way of information presentation is very user friendly especially when the symbols of the menu are displayed using a syntax of a natural language. The user can read it as a text and work with it without a need to call any help functions. The boxes being circumferential to groups of the fields 10-18 are drawn for illustrative purposes only, i.e. they are not a part of the displayed menu 19.

FIG. 2 illustrates the view 20B of the menu 19, wherein some of the symbols are displayed as their respective icons according to the correspondence tables of FIG. 4. In particular, the symbols in the fields 10-13, 17, and 18 are displayed as their respective icons. FIG. 3 illustrates the view 20C of the menu 19, wherein all symbols are displayed as their respective icons. With independent of the view of the menu 19, the symbols can be displayed using the syntax of the natural language.

Figure 5:
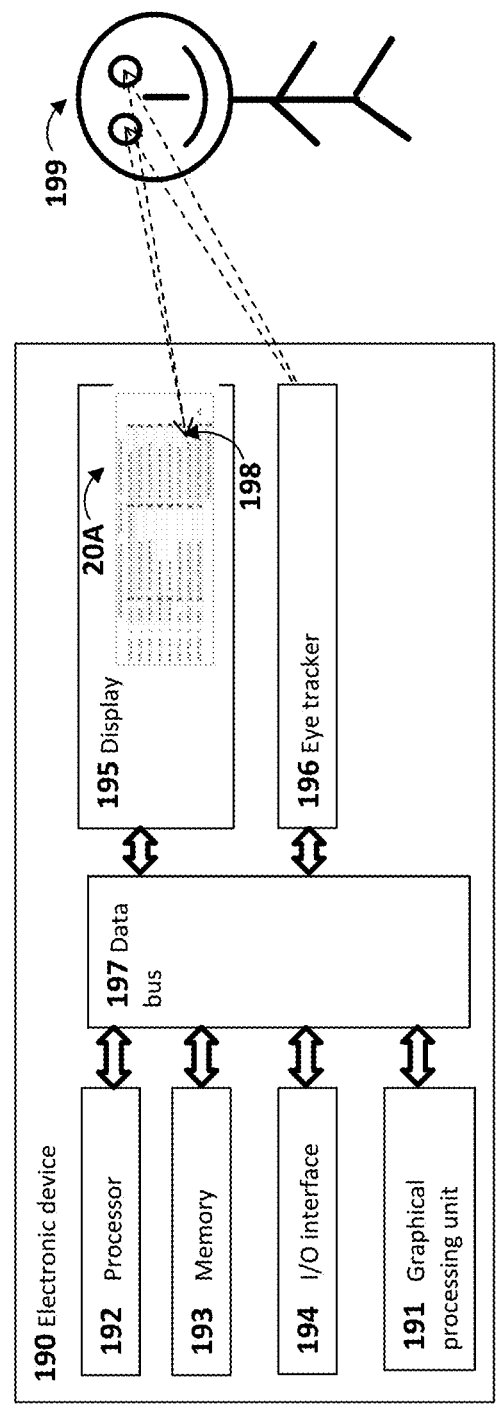
FIG. 5 is a block diagram of an electronic system.

FIG. 5 illustrates an example electronic system 190 being configured to dis-play the menu 19. The electronic system can be but is not limited to a hand held battery powered mobile system, a tablet, a smartphone, a home appliance equipment, a remote control unit of an electronic system, a computer, and a microcontroller. The electronic system 190 comprises a microprocessor 192, an eye tracker component 196, a display 195, and a memory 193. The memory 193 can comprise an executable code being executable by the microprocessor, which when executed cases the display to display different views 20A-C of the menu 19, to register sac-cades of user eyes of a user 199, to process the registered saccades. The micro-processor 192 can generate a display refresh data (e.g. color and light intensity of pixels of the display 195). Alternatively a graphical processing unit 191 of the electronic system 190 can generate the display refresh data. The electronic system can comprise further an input-output interface for communicating with the user. Alternatively or in addition this function can be performed by the display 195, when it has a touch screen functionality. The microprocessor 192, the memory 193, the input-output interface 194, the graphical processing unit 191, the display 195, the eye tracker component can be communicatively coupled to each other via a data bus 197.

The electronic system can be a battery powered electronic hand held system and the eye tracking component can comprises a video camera configured to register the saccades of the user eyes of the user. The electronic system can be configured to register user interaction events of the user with the symbols displayed on the menu, execute another executable code stored in the memory by the microprocessor in response to registering a user interaction event with one or more symbols displayed on the menu. The user interaction event can be registered via the input-output interface and/or the display, when the latter has a touch screen functionality.

Figure 6:
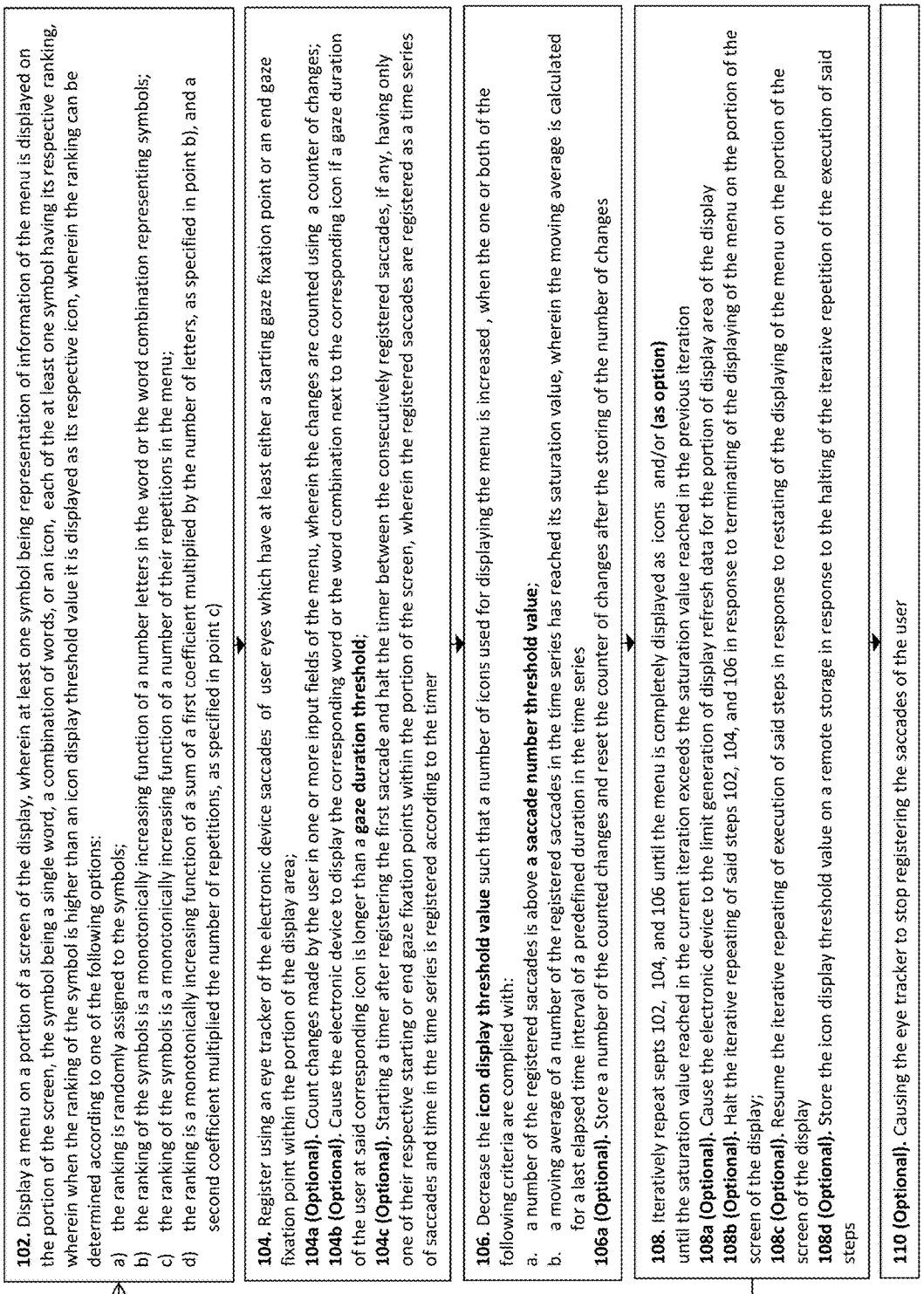
FIG. 6 is a block diagram of a process.

FIG. 6 illustrates a method which can be executed by the electronic device 109. The method begins with process block 102. In process block 102 the menu 19 is displayed on a portion of a screen of the display 195. The symbols of the menu representing information of the menu are displayed in the menu as a single word, a combination of words, or an icon. Each of the symbols has its respective ranking. When the ranking of the symbol is higher than an icon display threshold value it is displayed as its respective icon. The ranking can be determined according to one of the following options: a) the ranking is randomly assigned to the symbols, b) the ranking of the symbol is a monotonically increasing function of a number letters in the word or the word combination representing the symbol (i.e. the symbols like "perform installation of software patches" or "third central processing unit" (FIG. 4) with big amount of the letters in their respective word or word combinations have the higher ranking than the other symbols); c) the ranking of the symbol is a monotonically increasing function of a number of its repetitions in the menu (i.e. symbols which have high repetition rate like "today", "when", "is" (FIG. 4) in the menu have higher ranking than the other symbols); d) the ranking can be a linear combination of the ranking functions of points b) and c), e.g. the ranking of the symbol is an increasing function of a sum of a number of its repetitions in the menu multiplied by the first weight coefficient and a number of letters in the respective word or the respective word combination multiplied by a second weight coefficient.

Turning back the tables depicted on FIG. 4, the symbols of the menu 19 are split in two groups. The symbols in the left table have the ranking equal to two, while the symbols in the right table have the ranking equal to one. When the icons display threshold value is bigger than 2, then the menu 19 has the view 20A (FIG. 1). When the icons display threshold value is bigger than 1 and less than 2, then the menu 19 has the view 20B (FIG. 2). When the icons display threshold value is less than 1, then the menu 19 has the view 20C (FIG. 3).

Process block 104 is executed after process block 104. In process block 104 the electronic system registers saccades of user eyes using the eye tracker component. The electronic system can limit registering of the saccades to the ones which have at least either a starting gaze fixation point or an end gaze fixation point within the portion of the display area. Other saccades carry very little information, because they are triggered as usual by other than working with the menu events, e.g. when the user is interrupted for a phone call.

Figures 7, 8:
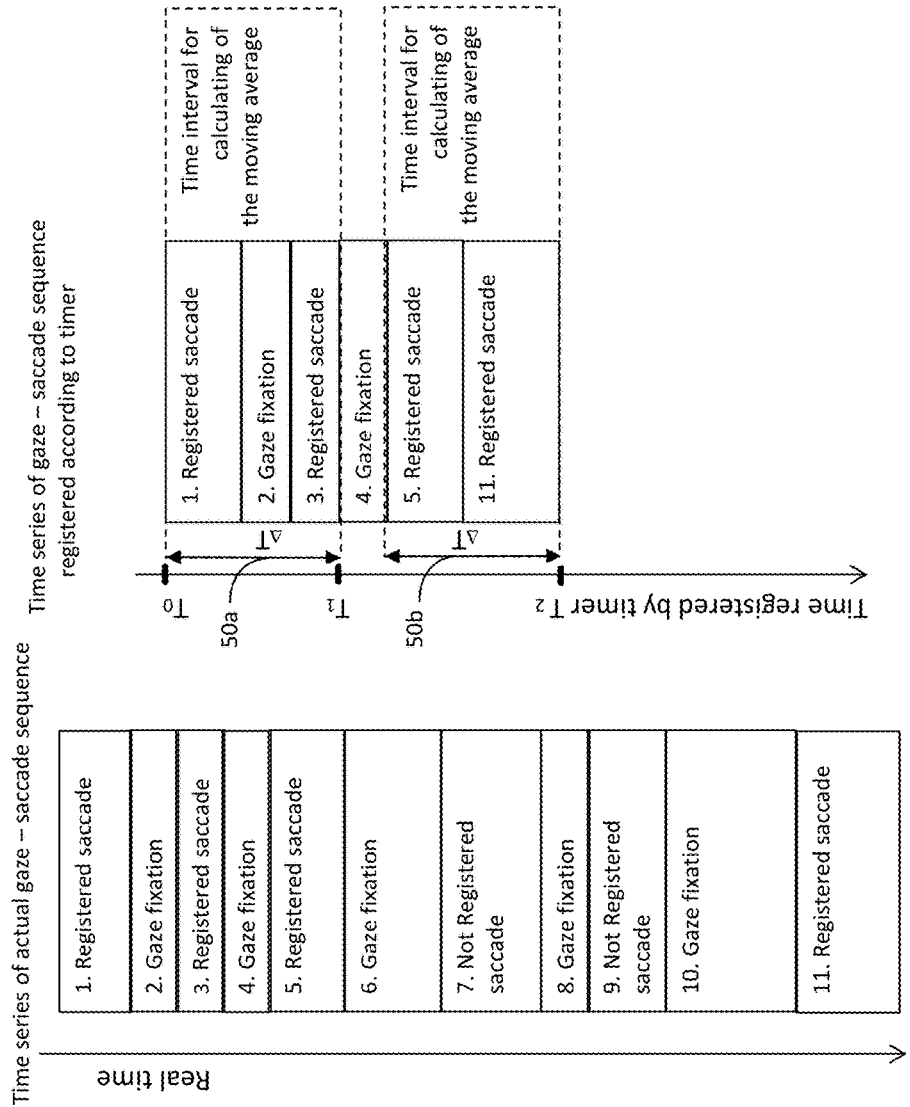
FIG. 7 is a time series of a saccade sequence.
FIG. 8 is a time series of a saccade sequence.

FIG. 7 illustrates a sequence of registered/not registered saccades and gaze fixation points 1-12 made by the user eyes in real time in accordance with criterion of process block 104. The first element in time series is a registered saccade, be-cause it has its starting gaze fixation point outside the portion of the display area displaying the menu and its end gaze fixation point inside said portion of the display area. The second element in the time series is a gaze fixation point on one of the symbols of the displayed menu. The third element in the time series is another registered saccade, because it has its starting and end gaze fixation points inside said portion of the display area displaying the menu. The fourth element in the time series is another gaze fixation point on another one of the symbols of the displayed menu. The fifth element in the time series is yet another registered saccade, because it has its starting gaze fixation points inside said portion of the display area displaying the menu and its end gaze fixation point outside said portion of the display area displaying the menu. The sixth element in the time series is yet another gaze fixation point outside said portion of the display area (e.g. another menu on the display or even another object, e.g. a telephone). The seventh element in the time series is a not registered saccade, because it has its starting and end gaze fixation points outside said portion of the display area displaying the menu. The eights element in the time series is yet another gaze fixation point outside said portion of the display area. The ninth element in the time series is another not registered saccade, because it has its starting and end gaze fixation points outside said portion of the display area displaying the menu. The tenth element in the time series is yet another gaze fixation point outside said portion of the display area. The eleventh element in time series is yet another registered saccade, because it has its starting gaze fixation point outside the portion of the display area displaying the menu and its end gaze fixation point inside said portion of the display area.

Process block 104 can comprise an optional process block 104a, in which a number of changes/input fields made by the user in the input fields is registered/counted using e.g. a counter of changes.

Process block 104 can comprise another optional process block 104b, in which the electronic device displays the corresponding word or the word combination 21 next to the corresponding icon (FIG. 2) if a gaze duration of the user at said corresponding icon is longer than a gaze duration threshold.

Process block 104 can further comprise additional process block 104c enabling detailed registration of saccades as a time series. In process block 104c a timer is stared after registering the first saccade and halted between the consecu-tively registered saccades, if any, having only one of their respective starting or end gaze fixation points within the portion of the screen, wherein the registered saccades are registered as a time series of saccades and time in the time series is registered ac-cording to the timer.

The result of registering of the saccades according to algorithm of process block 104c is illustrated on FIG. 8. The timer is started after the registering of the first saccade, i.e. the first element in the time series on FIG. 7 when time=T0 on FIG. 8. The elements 2-5 in the time series registered using timer (FIG. 8) and in the actual time series (FIG. 7) are the same, because the respective saccades comply the cri-terion of process block 104. The next element in the time series registered using tinier is the last saccade in the actual time series because it is the next following saccade in the actual time series which complies with the criterion for registration of process block 104.

Process block 106 is executed after process block 104. In process block 106 the icon display threshold value is decreased such that a number of icons used for displaying the menu is increased. For instance the icon display thresh-old value can be decrease from 4 to 1.5. As a result thereof the view 20B is displayed instead of the view 20A. Process block 106 is executed when one or both of the following criteria are complied with: a) a number of the registered saccades in process block 104 is above a saccade number threshold value, b) a moving average of a number of the registered saccades in the time series has reached its satu-ration value, wherein the moving average is calculated for a last elapsed time interval of a predefined duration in the time series.

An illustrative example of the calculation of the moving average is depicted on FIG. 8. The moving average of a number of the registered saccades is calculated for a fixed time interval $\Delta T$ 50a, 50b. At the moment of time T1 the moving average of the registered saccades is equal to 2 per time interval $\Delta T$. At the moment of time T2 the moving average of the registered saccades per time interval $\Delta T$ is equal to 2 as well.

Process block 106 can comprise an optional process block 106a, in which a number of the counted changes/inputs made by the user in the input fields of the menu a stored, and the counter of the changes after the storing of the number of changes is set to zero.

Process block 108 is executed after process block 106. In process block 108 the process blocks 102, 104, and 106 are iteratively repeated until the menu is completely displayed as icons. Alternatively the iterative repetition of said process blocks can be terminated when the saturation value reached in the current iteration exceeds the saturation value reached in the previous iteration if the latter is available. The latter criterion can indicate that perception of the interface by the user starts to degrade, i.e. the menu is too heavily saturated with icons.

Process block 108 can comprise an optional process block 108a, in which the electronic device the limits generation of display refresh data for the portion of display area of the display displaying the menu. This feature can be beneficial for optimization of the energy consumption by the electronic system because of the following. A screen area used for displaying on the screen of at least of one of the icons is less than a screen area used for displaying on the screen of its respective word or word combination (e.g. the icon of the computer system requires less display area than displaying the text "COMPUTER SYSTEM"). A screen area used for the displaying of the menu on the portion of the screen in one of the iterations is bigger than a screen area used for the displaying of the menu on the portion of the screen in another one of the iterations executed after the one of the iterations. Thus execution of the method depicted on FIG. 6 enables reduction of the screen area used for displaying of the menu on the portion of the screen and as a result thereof a number of pixels for which the refresh display data (e.g. intensity and color) has to be generated is reduced through-out execution of the method depicted on FIG. 6.

Process block can comprise optional process block 108b, in which the itera-tive repeating of said process blocks 102, 104, and 106 is halted in response to ter-minating of the displaying of the menu on the portion of the screen of the display.

Process block 108 can comprise another optional process block 108c, in which the iterative repeating of execution of said process blocks 102, 104, and 106 is resumed in response to restating of the displaying of the menu on the portion of the screen of the display.

Figure 9:
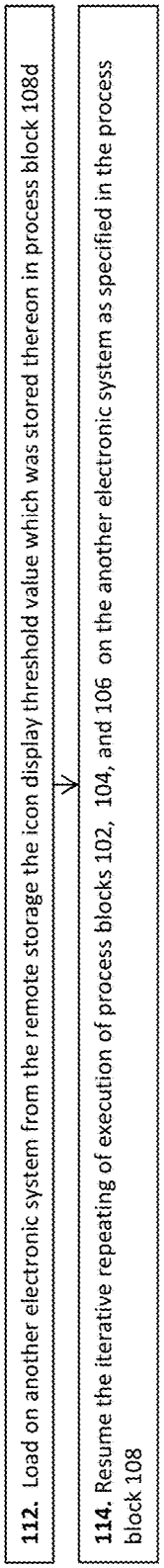
FIG. 9 is a block diagram of a process.

Process block 108 can comprise yet another optional process block 108d, in which the icon display threshold value is stored on a remote data storage in re-sponse to the halting of the iterative repetition of the execution of said steps. The stored icon display threshold value can be loaded on another electronic system configured to display the menu 19 (process block 112 on FIG. 9) for resuming iterative execution of said process blocks 102, 104, and 106 on it using the loaded icon display threshold value (process block 114 on FIG. 9). The another electronic system can have the same architecture as the electronic system depicted on FIG. 5.

An optional process block 110 is executed after process block 108, in which the registering of the saccades of the user eyes using the eye tracker component is stopped.

Figure 10:
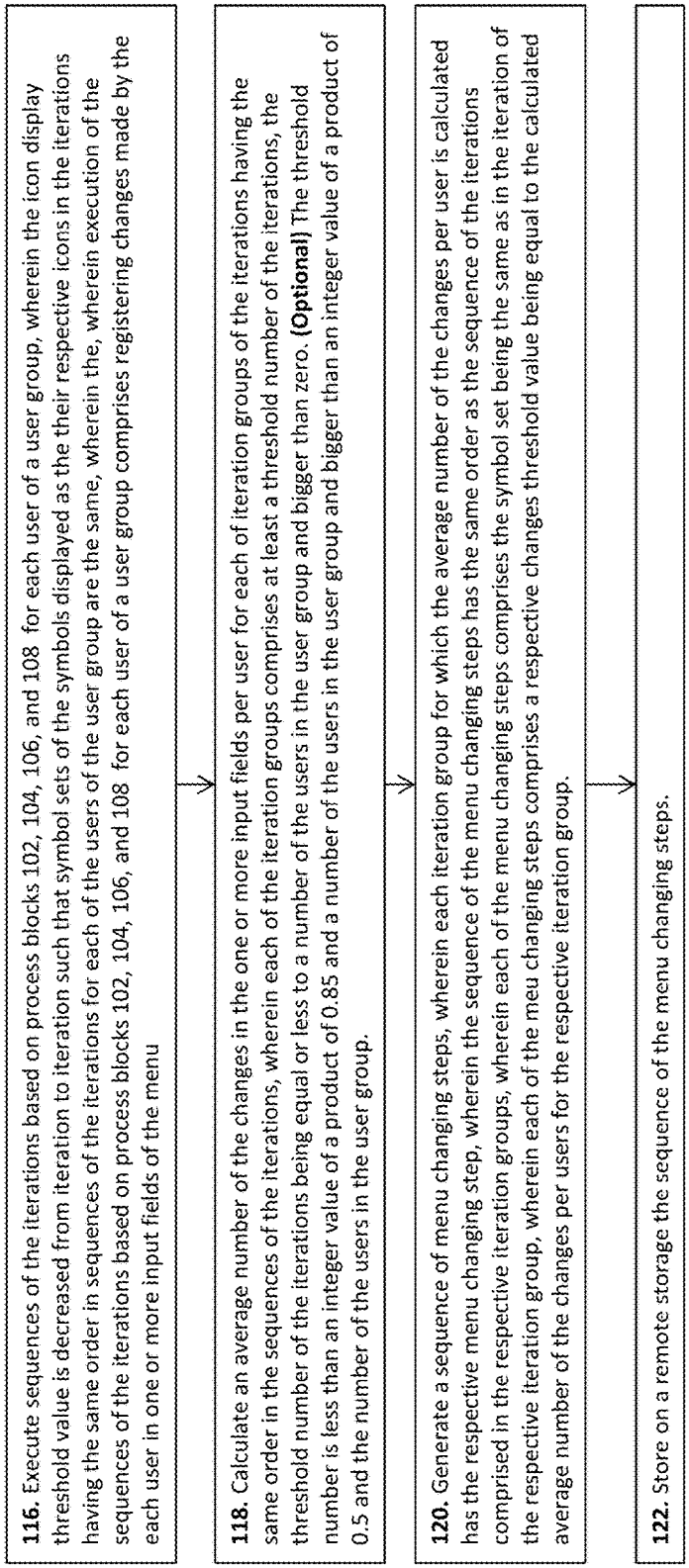
FIG. 10 is a block diagram of a process.

FIG. 10 illustrates a process blocks of a method enabling extension of the method depicted on FIG. 6 for electronic systems which do not use the eye tracking functionality. The method beings with process block 116. In process block 116 pro-cess blocks 102, 104, 106, and 108 are executed for each user of a user group. The icon display threshold value is decreased from iteration to iteration such that symbol sets of the symbols displayed as the their respective icons in the iterations having the same order in sequences of the iterations for each of the users of the user group are the same. This means that each of the users is confronted with the same sequence of the menu views (e.g. sequence of the menu views 20A, 20B, 20C having corresponding symbols stets, wherein a first set corresponding to view 20A is an empty set, a second set corresponding to view 20B is a list of symbols in the left table having ranking=2 on FIG. 4, a third set corresponding to view 20C is a list of symbols in both of the tables on FIG. 4, i.e. the third set comprises all symbols). The executing of the process blocks 102, 104, 106, and 108 for the each user of the user group comprises registering changes made by the each user in one or more input fields of the menu as specified in the process blocks 104a and 106a.

Process block 118 is executed after process block 116. In process block 118 an average number of the changes in the one or more input fields of the menu per user is calculated for each of iteration groups of the iterations having the same order in the sequences of the iterations. Process block 118 can be executed only for each of the iteration groups comprising at least a threshold number of the iterations. The threshold number of the iterations be can equal or less to a number of the users in the user group and bigger than zero, preferably bigger or equal to an integer of a ratio of a number of the users in the user group. In the other words, in order to have reliable statistics it might be necessary to select only iterations which were completed by at least certain percentage of the users (e.g. not less than 50% of the users).

Execution of process block 118 is illustrated using table on FIG. 11 and table on FIG. 12. The table FIG. 11 summarizes data for 6 users. For each of the users the method of FIG. 6 is executed in menu views 20A, 20B, and 20C. Only users 1 and 2 have used all three views. The rest of the users have used only the first two views. The users 3-6 could for instance stop using the menu, before the statistics the method of FIG. 6 was completed. As it mentioned before the processing of the collected data can be limited to the first two iterations because not enough users have completed the third iteration. The columns indicated a number of changes/inputs in one or more input fields of the menu made by each of the users in a single iteration. The first row in table on FIG. 12 row shows average value of the inputs made in each of the iterations made per user. In order to have a reliable statistics, only iterations which were completed by at least 50% of the users can be used for further processing in the method. As a result thereof, the statistics of the third iteration has to be discarded, when the aforementioned criterion is applied.

Process block 120 is executed after process block 118. In process block 120 a sequence of menu changing steps is generated. Each iteration group for which the average number of the changes per user is calculated in process block 118 has the respective menu changing step (e.g. rows 300 and 302 in the table on FIG. 12). The sequence of the menu changing steps has the same order as the sequence of the iterations comprised in the respective iteration groups, or iterations as depicted in row 300 in the table on FIG. 12. Each of the menu changing steps comprises the symbol set being the same as in the iteration of the respective iteration group (row 303 in the table on FIG. 12). Each of the menu changing steps comprises a respective changes threshold value being equal to the calculated average number of the changes per user for the respective iteration group (row 301 in the table on FIG. 12). Alternatively the changes threshold value can be an integer value of the average number of the changes per user for the respective iteration group.

Process block 122 is executed after process block 120. In process block 122 the sequence of the menu changing steps is stored on a remote data storage. The remote data storage can be but is not limited to, a memory card, a data storage in a computer cloud, and a memory stick.

FIG. 13 illustrates another method where the sequence of the menu changing steps is used by another electronic system configured to display the menu. The method begins with process block 124. In process block 124 the sequence of the menu changing steps generated in process block 120 is loaded from the remote data storage on the another electronic system. The another electronic system can have the same architecture as the electronic system depicted on FIG. 5. However the another electronic system does not necessarily need to have the eye tracking component, or its eye tracking component does not have to be used for execution of the method illustrated on FIG. 13.

Process block 126 is executed after process block 124. Execution of process block 126 causes iterative repetitive execution of the next following process blocks 128 and 130 according to the sequence of the menu changing steps. The execution of the next iteration is started when a number of the registered changes made by another user in the one or more input fields of the menu in the current iteration exceeds the changes threshold value of the menu changing step of the current iteration. In process block 128, the menu on a portion of a screen of the display of the another electronic system is displayed. The symbols of the symbol set of the menu changing step of the current iteration are displayed in the menu as their respective icons if the symbol set of the menu changing step of the current iteration is not an empty set. Process block 130 is executed in parallel with process block 128. In process block 130 changes made by another user in the one or more input fields of the menu displayed on the portion of the screen of the display of the another electronic system are registered.

Turning back the example table on FIG. 12, the execution of the method on FIG. 13 can be illustrated as follows. First execution of process blocks 124, 126, 128, and 130 results in displaying of the view 20A on the display. After the user makes 6 changes in the one or more input fields of the menu, the next iterative execution of the process blocks 126, 128, 130 is started. In this iteration the view 20B is displayed on the display. After the user makes 5 changes in the one or more input fields of the menu, the another next iterative execution of the process blocks 126, 128, 130 is started. In this iteration the view 20C is displayed on the display.

What is claimed is:

1. A method performed by a microprocessor for controlling an electronic system, the method comprising:
   causing display of a menu including at least two symbols on a portion of a screen, the at least two symbols representing information of the menu, each of the at least two symbols being represented as a single word, a combination of words, or an icon, each of the at least two symbols having a ranking, each respective symbol of the at least two symbols being displayed as the icon when the ranking of the respective symbol is higher than an icon display threshold value;
   registering saccades having a starting or an end gaze fixation point within the portion of the screen;
   decreasing the icon display threshold value such that a quantity of the at least two symbols being displayed as the icon increases when a quantity of the registered saccades exceeds a saccade number threshold value; and
   iteratively repeating execution of the causing display of the menu, the registering the saccades, and the decreasing the icon display threshold value, until the menu is fully displayed on the portion of the screen as the icon,
   wherein
   a first screen area used for displaying the at least two symbols as the icon is less than a second screen area used for displaying the at least two symbols as the single word or the combination of words, and
   an initial screen area used for displaying the menu during a first iteration of the iteratively repeating execution is bigger than a subsequent screen area used for displaying the menu during a second iteration of the iteratively repeating execution, the second iteration being subsequent to the first iteration.

2. A method performed by a microprocessor for controlling an electronic system, the method comprising:
   causing display of a menu including at least two symbols on a portion of a screen, the at least two symbols representing information of the menu, each of the at least two symbols being represented as a single word, a combination of words, or an icon, each of the at least two symbols having a ranking, each respective symbol of the at least two symbols being displayed as the icon when the ranking of the respective symbol is higher than an icon display threshold value;
   registering saccades having a starting or an end gaze fixation point within the portion of the screen, including
   starting a timer after registering a first saccade, and
   halting the timer in response to determining that a second registered saccade has only one of the starting or the end gaze fixation points within the portion of the screen, the registered saccades being registered as a time series of saccades according to the timer;
   decreasing the icon display threshold value such that a quantity of the at least two symbols being displayed as the icon increases when a moving average of a number of the registered saccades in the time series of saccades has reached a corresponding saturation value, the moving average being calculated for a last elapsed time interval of a defined duration in the time series of saccades; and
   iteratively repeating execution of the causing display of the menu, the registering the saccades, and the decreasing the icon display threshold value, until the menu is fully displayed on the portion of the screen as the icon or a first saturation value reached in a current iteration exceeds a second saturation value reached in a previous iteration,
   wherein
   a first screen area used for displaying the at least two symbols as the icon is less than a second screen area used for displaying the at least two symbols as the single word or the combination of words, and
   an initial screen area used for displaying the menu during a first iteration of the iteratively repeating execution is bigger than a subsequent screen area used for displaying the menu during a second iteration of the iteratively repeating execution, the second iteration being subsequent to the first iteration.

3. The method of claim 2, wherein
   the electronic system is a battery powered electronic hand held system configured to register user interaction events with the at least two symbols;
   the registering the saccades includes using an eye tracking component including a video camera configured to register the saccades; and
   the method further comprises registering a user interaction event with one or more of the at least two symbols.

4. The method of claim 2, comprising:
   causing the electronic system to limit generation of display refresh data for the portion of the screen in response to the iteratively repeating execution.

5. The method of claim 2, comprising:
   halting the iteratively repeating execution in response to terminating the causing display of the menu; and
   resuming the iteratively repeating execution in response to resuming the causing display of the menu.

6. The method of claim 2, wherein the ranking of each respective symbol is an increasing function of a sum of a quantity of repetitions of the respective symbol in the menu multiplied by a first weight coefficient and a quantity of letters in the single word or the combination of words by which the respective symbol is represented multiplied by a second weight coefficient.

7. The method of claim 2, wherein the at least two symbols are arranged in accordance with a syntax of a natural language.

8. The method of claim 2, comprising:
   halting the iteratively repeating execution in response to terminating the causing display of the menu; and
   storing the icon display threshold value on a remote data storage in response to the halting the iteratively repeating execution.

9. The method of claim 8, wherein the storing the icon display threshold value enables another microprocessor controlling another electronic system to load the icon display threshold value from the remote data storage for use in displaying another menu.

10. The method of claim 2, comprising:
    executing the causing display of the menu, the registering saccades, the decreasing the icon display threshold value, and the iteratively repeating execution for each user of a user group, the decreasing the icon display threshold value including decreasing the icon display threshold value such that a set of symbols of the at least two symbols displayed as the icon having a same order in sequences of iterations for each of the users of the user group are the same;

registering changes made by each user of the user group in one or more input fields of the menu;

calculating an average quantity of the registered changes in the one or more input fields for each user of each of a plurality of iteration groups having the same order as the sequences of the iterations, each of the plurality of iteration groups including at least a threshold quantity of the iterations, the threshold quantity of the iterations being equal to or less than a quantity of the users in the user group and more than zero;

generating a sequence of menu changing operations, each of the plurality of iteration groups for which the average quantity of the registered changes is calculated performing the sequence of menu changing operations, the sequence of menu changing operations having a same order as a sequence of iterations performed by the plurality of iteration groups, each menu changing operation in the sequence of menu changing operations including the causing display of the menu in which a respective symbol set of at least two symbols is displayed as the icon for users of a respective iteration group of the plurality of iteration groups, each menu changing operation in the sequence of menu changing operations being associated with a different symbol set of the at least two symbols being displayed as the icon, each menu changing operation in the sequence of menu changing operations including a respective changes threshold value being equal to the calculated average quantity of the registered changes for each user of the user group for the respective iteration group; and storing, on a remote data storage, the sequence of menu changing operations.

11. The method of claim 10, wherein the storing the sequence of menu changing operations enables another microprocessor controlling another electronic system to load the sequence of menu changing operations from the remote data storage for use in displaying another menu.

12. An electronic system, comprising:
an eye tracker component;
a display;
a memory storing an executable code; and
a microprocessor configured to execute the executable code to cause display of a menu including at least two symbols on a portion of a screen of the display, the at least two symbols representing information of the menu, each of the at least two symbols being represented as a single word, a combination of words, or an icon, each of the at least two symbols having a ranking, each respective symbol of the at least two symbols being displayed as the icon when the ranking of the respective symbol is higher than an icon display threshold value, register, using the eye tracker component, saccades having a starting or an end gaze fixation point within the portion of the screen, decrease the icon display threshold value such that a quantity of the at least two symbols being displayed as the icon increases when a quantity of the registered saccades exceeds a saccade number threshold value; and iteratively repeat execution of the causation of display of the menu, the registration of the saccades, and the decrease of the icon display threshold value, until the menu is fully displayed on the portion of the screen as the icon, wherein
a first screen area used for displaying the at least two symbols as the icon is less than a second screen area used for displaying the at least two symbols as the single word or the combination of words, and an initial screen area used for displaying the menu during a first iteration of the iterative repetition is bigger than a subsequent screen area used for displaying the menu during a second iteration of the iterative repetition, the second iteration being subsequent to the first iteration.

13. A first electronic system, comprising:
an eye tracker component;
a display;
a memory storing an executable code; and
a first microprocessor configured to execute the executable code to cause display of a menu including at least two symbols on a portion of a screen of the display, the at least two symbols representing information of the menu, each of the at least two symbols being represented as a single word, a combination of words, or an icon, each of the at least two symbols having a ranking, each respective symbol of the at least two symbols being displayed as the icon when the ranking of the respective symbol is higher than an icon display threshold value, register, using the eye tracker component, saccades having a starting or an end gaze fixation point within the portion of the screen, including starting a timer after registering a first saccade, and halting the timer in response to determining that a subsequent registered saccade has only one of the starting or the end gaze fixation points within the portion of the screen, the registered saccades being registered as a time series of saccades according to the timer, decrease the icon display threshold value such that a quantity of the at least two symbols being displayed as the icon increases when a moving average of a number of the registered saccades in the time series of saccades has reached a corresponding saturation value, the moving average being calculated for a last elapsed time interval of a defined duration in the time series of saccades, and iteratively repeat execution of the causation of display of the menu, the registration of the saccades, and the decrease of the icon display threshold value, until the menu is fully displayed on the portion of the screen as the icon or a first saturation value reached in a current iteration exceeds a second saturation value reached in a previous iteration, wherein
a first screen area used for displaying the at least two symbols as the icon is less than a second screen area used for displaying the at least two symbols as the single word or the combination of words, and an initial screen area used for displaying the menu during a first iteration of the iterative repetition is bigger than a subsequent screen area used for displaying the menu during a second iteration of the iterative repetition, the second iteration being subsequent to the first iteration.

14. The first electronic system of claim 13, wherein the first microprocessor is configured to execute the executable code to:

halt the iterative repetition in response to terminating the causation of display of the menu; and store the icon display threshold value on a remote data storage in response to the halt of the iterative repetition.

15. The first electronic system of claim 14, wherein the storage of the icon display threshold value enables a second microprocessor of a second electronic system to load the icon display threshold value from the remote data storage for use in displaying another menu.

\* \* \* \* \*